(12) United States Patent
Hayes

(10) Patent No.: US 7,194,620 B1
(45) Date of Patent: Mar. 20, 2007

(54) METHOD FOR REAL-TIME DATA AUTHENTICATION

(75) Inventor: David Scott Hayes, Celina, TX (US)

(73) Assignee: Verizon Business Global LLC, Ashburn, VA (US)

( * ) Notice: Subject to any disclaimer, the term of this patent is extended or adjusted under 35 U.S.C. 154(b) by 0 days.

(21) Appl. No.: 09/406,910

(22) Filed: Sep. 24, 1999

(51) Int. Cl.
*H04L 9/00* (2006.01)
(52) U.S. Cl. ............... 713/157; 713/155; 713/156; 713/159; 380/280
(58) Field of Classification Search ............... 713/157, 713/177
See application file for complete search history.

(56) References Cited

U.S. PATENT DOCUMENTS

| 5,200,999 A | * | 4/1993 | Matyas et al. ............... 380/277 |
| 5,646,999 A | * | 7/1997 | Saito ............................ 705/54 |
| 5,689,563 A | * | 11/1997 | Brown et al. ............... 380/247 |
| 5,761,309 A | * | 6/1998 | Ohashi et al. ............... 713/156 |
| 6,076,077 A | * | 6/2000 | Saito ............................ 705/51 |
| 6,226,618 B1 | * | 5/2001 | Downs et al. ................ 705/1 |

* cited by examiner

*Primary Examiner*—Syed A. Zia

(57) ABSTRACT

A digital signature is applied to digital data in real-time. The digital signature serves as a mark of authenticity assuring a recipient that the digital data did in fact originate from an indicated source. The digital signature may be applied to any digital data, including video signals, audio signals, electronic commerce information, data pertaining to land vehicles, marine vessels, aircraft, or any other data that can be transmitted and received in digital form.

13 Claims, 5 Drawing Sheets

METHOD FOR REAL-TIME DATA AUTHENTICATION

BACKGROUND OF THE INVENTION

1. Field of the Invention

The present invention relates to data authentication, and more particularly to a method for real-time data authentication utilizing a combination of public-key cryptography and digital signatures.

2. Discussion of the Related Art

Various systems and methods exist for protecting data transmitted over particular transmission mediums. For example, public-key cryptography may be utilized. Public-key cryptography, also known as asymmetric encryption, involves the encryption and subsequent decryption of data utilizing a key pair comprising a public key and a private key. Essentially, the data to be encrypted is combined with the public key in accordance with a predetermined encryption algorithm. One the data is encrypted, it is transmitted via a specific medium, for example, electronic mail. Once received, the encrypted data may only be decrypted by correct application of the private key in accordance with a decryption function. Typically, the public key of the key pair is widely distributed so that individuals desiring to encrypt data may do so relatively easily. However, the data may only be decrypted with the matching private key which should only be in the possession of individuals previously designated by the owner or distributor of the public key.

Cryptographers consider that with all things being equal, a larger key is more secure than a smaller key. Therefore, the keys comprising a key pair are often relatively large in length, typically more than two thousand binary bits (approximately six hundred decimal digits). This relatively large size of the keys makes it uneconomical for an unintended recipient of the encrypted data to determine the private key and thus decrypt the data by trying all possible values.

Public-key cryptography, as described above, has traditionally been used to ensure the integrity of data. Used properly however, encryption may also be used to identify the source of the data. This is clearly important even when the data itself is not private. Thus, public-key cryptography may serve as a technique for authenticating the data by verifying that the data came from a source specifically identified by the private-key. In this regard, the data is said to be signed, that is, affixed with a digital signature created only by the holder of a private key. Anyone who knows the corresponding public key can verify the digital signature. This assures that the data did in fact come from the person who holds the private key, and that the data has not been altered.

To create a digital signature for data, the sender first applies a cryptographic hash function to the data. This hash function accepts any amount of input data, and produces a fixed-size output, typically between 64 and 256 bits (20 to 80 decimal digits). The hash function has two important properties. First, if any portion of the input data is changed even slightly, the output has a value which will be completely different. Second, it is very difficult to find or construct input data that will produce a given desired hash output.

The hash value is then encrypted, using the sender's private key. The data and the encrypted hash function are sent to a receiver. The receiver first computes his own hash value based on the data portion of the received message. The receiver also decodes the encrypted hash value using the sender's public key. If the two hash values match, the receiver knows that the message must have come from the holder of the public key. The receiver knows that the message came from the holder of the public key because the encrypted hash value was decoded with the sender's public key. Only the sender's private key could have done this encryption in the first place. Accordingly, since the private portion of the key pair is assumed to be held secret by the keyholder, no one else could have performed the encryption. The receiver also knows that the data portion has not been changed since the sender signed it because the received encrypted hash value matches the value the receiver computed himself or herself. The encrypted hash value was computed at the time of the message signature. Any change in the data would have drastically changed the hash value. Accordingly, the encrypted value sent with the message would not match the value the receiver computes.

Although a digital signature assures the integrity of the data, it does not assure the identity of the sender. The receiver knows only that the data was signed by the holder of the private key, but they cannot be assured that any particular person is the holder of that key. Anyone could have generated a key pair, and attached the name of some other party to that key pair. This inability to reliably associate a real human being with a key pair is known as "the trust problem."

To address the trust problem, digital signatures are often used in conjunction with public-key certificates, or simply certificates. A certificate includes an identification of a keyholder (such as a name, address, phone number, or e-mail address), a copy of the public portion of the keyholder's key pair, and a digital signature from a third party certificate authority. The certificate authority functions as a sort of digital notary, attesting by its signature in the certificate that the keyholder identified is the real holder of the key pair given. The certificate is in effect a digital identification card.

The use of a certificate in this manner reduces the trust necessary. The receiver need no longer trust the identity proclaimed by the sender's certificate. The receiver can rely on the certificate authority's signature incorporated into the sender's certificate, attesting to the sender's identity. This means that the receiver is trusting that the certificate authority's procedure for verifying identity works, and that the certificate authority has followed its procedure.

In addition to the privacy and trust issues discussed above, other issues do exist that pose potential pitfalls to the use of encryption. These other issues include computing time and ease of implementation and use. These issues are discussed below with respect to various encryption systems and methodologies.

Various encryption programs are known to exist. One such system is known as PGP (for "Pretty Good Privacy") from Network Associates, Inc. PGP is primarily used to encrypt e-mail messages, but any other type of data may be encrypted. PGP can also apply digital signatures to data, and it can both sign and encrypt the same data. To sign or verify a message, PGP uses a single, large size key pair, such as one having a default value of 2,048 bits or longer. This makes it infeasible for an adversary to happen upon the right value of a PGP key pair by simply guessing. However, the large size of PGP keys means that PGP takes significant computer time to create or verify a digital signature.

Another encryption system involves SSL3 (for "Secure Sockets Layer 3"). SSL3 is a protocol often used in web browsers to provide confidentiality. SSL3 may also be used to provide authentication services. For instance, when a connection is established, either side in an SSL3 exchange can request that the other side identity itself by means of a public-key certificate. SSL3 does not explicitly cite the size of the key used, but in practice, all key pairs are relatively long. The shortest known implementation uses a minimum key length of 512 bits (160 decimal digits). The cryptographic community does not consider this size long enough to be secure against a determined adversary. Unfortunately, SSL3 requires a negotiation between the server and the client at the beginning of the communication. So, even if confidentially is not desired, the client must tell the server what cryptographic services it wants, which makes the protocol unsuitable for use in a real-time environment where there may be multiple recipients. Further, the protocol negotiation at the beginning prevents anyone from joining an already established communication.

Another encryption system is known as IPSEC, for Internet Protocol Security. IPSEC is a relatively new standard and will be included as part of the next version of TCP/IP called Ipv6. IPSEC provides confidentiality and keeps eavesdroppers from listening to messages. IPSEC operates at the IP layer (OSI layer 3), such that when data passes through several routers on its way to the destination, IPSEC decodes and re-encodes the data enroute. Clearly, this could be time-consuming and require a significant amount of computer time to accomplish successfully.

Hence, there exists a need to perform real-time authentication of data by applying a digital signature, without requiring a tremendous amount of time or computing power, while at the same time providing a high degree of security and ease of implementation.

SUMMARY OF THE INVENTION

The method for real-time data authentication of the present invention overcomes the limitations of the prior art discussed above.

In accordance with a first aspect, the present invention is directed to a method for authenticating transmitted data in real time. The method comprising the steps of generating a master cryptographic key pair, including a first public key and a first private key, publishing a first certificate issued by a certificate authority, the first certificate including the first public key and a first digital signature based on the first public key, generating a disposable cryptographic key pair, including a second public key and second private key, generating a second certificate, the second certificate including the second public key and a second digital signature based on the second public key, publishing the second certificate, signing the data to be transmitted with a third digital signature by processing the data through a one way hashing function to generate a first hash value and encrypting the first hash value utilizing the second private key, processing the received data through the one way hashing function to create a second hash value, decrypting the received third digital signature utilizing the second public key to obtain a third hash value, and verifying the authenticity of the data by comparing the second hash value to the third hash value.

In accordance with another aspect, the present invention is directed to a method for digitally signing data in real time. The method comprising the steps of generating a master key pair including a first public key and a first private key, publishing a first certificate, the first certificate including the first public key and a first digital signature based on a certificate authority's key pair, generating a disposable key pair, the disposable key pair including a second public key and a second private key, and wherein the disposable key pair is shorter than the master key pair, generating a second certificate, the second certificate including the second public key and a second digital signature based on the master key pair, dividing the data to be signed into packets, for each packet of data, computing a hash value based on the data in that data packet utilizing a one way hashing function, encrypting the hash value utilizing the second private key as the encryption key; and coupling each encrypted hash value with its corresponding data packet.

In accordance with another aspect, the present invention is directed to a method for verifying digitally signed data in real time. The method comprising the steps of processing the data portion of the digitally signed data through a one way hashing function to obtain a first hash value for each packet of digitally signed data, verifying the contents of a first certificate issued by a certificate authority utilizing a public key issued by the certificate authority, the first certificate including a first public key of a long master key pair, verifying the contents of a second certificate issued by the sender of the data utilizing the first public key from the first certificate, the second certificate including a second public key of a short disposable key pair, decrypting the digital signature portion of the digitally signed data utilizing the second public key to obtain a second hash value, and comparing the first and second hash values.

In accordance with another aspect, the present invention is directed to a method for digitally signing data in real time. The method comprising the steps of generating a disposable key pair, the disposable key pair including a short public key and a short private key, publishing the short public key, dividing the data to be signed into packets, for each packet of data, computing a hash value based on the data in that data packet utilizing a one way hashing function, encrypting the hash value utilizing the short private key, and coupling each encrypted hash value with its corresponding data packet.

In accordance with another aspect, the present invention is directed to a method for verifying digitally signed data in real time. The method comprising the steps of processing the data portion of the digitally signed data through a one way hashing function to obtain a first hash value for each packet of digitally signed data, decrypting the digital signature portion of the digitally signed data utilizing a published short public key to obtain a second hash value, and comparing the first and second hash values.

The present invention is directed to a simple to implement, effective and efficient method to authenticate digital data in real time utilizing a combination of cryptographic key pairs, disposable cryptographic key pairs that are limited in size and duration, hashing functions, weak hashing functions to increase computational speeds, certificates from certificate authorities and self generated certificates. Essentially, the method of the present invention utilizes a series of certificates and digital signatures to serve as a mark of authenticity assuring a recipient that the data did in fact originate from an indicated source. The first certificate comprises the information required to decrypt and verify the information in the second certificate. The second certificate comprises the information required to decrypt and verify the actual data. The data is packetized and each packet is digitally signed utilizing a weak hashing function and short public key to decrease computational time. At the receiver's end, the digital signature is decoded to authenticate the data. Since the data itself is not encrypted, a receiver may utilize the data even though it is not verified.

BRIEF DESCRIPTION OF THE DRAWINGS

The foregoing and other features and advantages of the present invention will be apparent from the following, more particular description of preferred embodiments of the invention, as illustrated in the accompanying drawings. In the drawings, like reference numbers indicate identical or functionally similar elements. Additionally, the left most digit of a reference number indicates the drawing in which the reference number first appears.

DETAILED DESCRIPTION OF THE PREFERRED EMBODIMENTS

The present invention is directed to a method for authenticating data in real-time. The present invention utilizes a series of certificates and digital signatures to serve as a mark of authenticity assuring a recipient that the data did in fact originate from an indicated source. The first certificate comprises the information required to decrypt and verify the information in the second certificate and is signed. The second certificate, which is also signed comprises the information required to decrypt and verify the actual data. While the first certificate comprises a public key which is robust, the second certificate utilizes a smaller, less robust public key, thereby increasing the computational speed required for real-time authentication.

A sender desires to transmit data and wants the receiver to be able to authenticate the data in real time. As described above, the data to be transmitted may be any type of digital data, for example, digital video or digital audio. In addition, the method for real time data authentication may be utilized in conjunction with any type of transmission medium, for example, land line or wireless. For purposes for describing the exemplary embodiment, it shall be assumed that the sender is a television station and the receiver is anyone tuned to that particular station.

Figure 1:
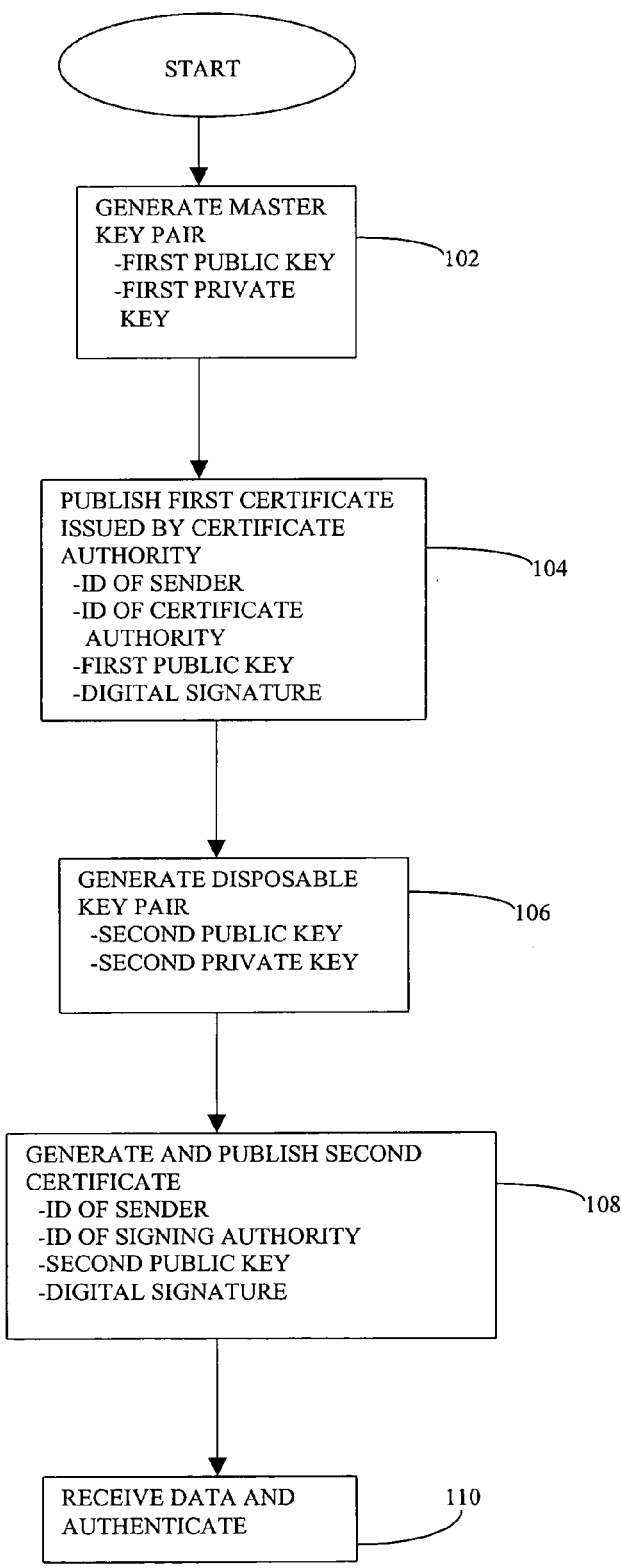
FIG. 1 is a flow chart of an exemplary method for real time data authentication in accordance with the present invention.

FIG. 1 is a flow chart 100 setting forth the steps of an exemplary embodiment of the method for real time data authentication in accordance with the present invention. Given that the sender desires to transmit data and have the receiver be able to authenticate the data, the identity of the sender, whether the sender is an individual or an entity, is preferably made known. To accomplish this, the sender generates a master cryptographic key pair as illustrated in FIG. 1 as step 102. The master key pair comprises a first public key and a first private key. As stated above, in public key cryptography, public keys are normally utilized to encode the data to be transmitted and is usually widely distributed, whereas the private key is normally used to decode the data and is usually retained in secret and is only distributed to specific designees. Although the master key pair is generated as a set, the public and private keys are typically utilized independently as is discussed in detail subsequently. The master key pair may comprise any suitably long public and private keys sufficient to prevent individuals from decrypting any encrypted data in a reasonably short period of time.

In the next step, the sender publishes a first certificate as illustrated in FIG. 1 as step 104. The first certificate is preferably published as widely as possible so that as many potential receivers will have it available. The first certificate may be published in any number of ways and methods therefor are known to those having skill in the relevant art. Although the sender publishes the first certificate, the first certificate is issued by a certificate authority. The certificate authority functions as a sort of digital notary. The certificate issued by the certificate authority, typically for a fee, is in effect a digital identification card which is certified as valid for a given period of time. The first certificate comprises an identification of the sender, an identification of the certificate authority, a copy of the first public key of the master cryptographic key pair generated by the sender and a cryptographic check sum. The identification of the sender may include any identifying information such as the sender's name, e-mail address or domain name. The type of identifying information utilized depends on the nature of the sender and/or the nature of the data. The identification of the certificate authority may include any information that identifies the agency issuing the certificate. The first public key is included in the first certificate so that it may be widely published with the certificate, its use will become clear in subsequent discussion. The cryptographic check sum is an encrypted hash or digital signature. This digital signature ensures that the data or information to which it is affixed has not been modified since it was transmitted. In this case, the integrity of the first three items of the first certificate; namely, the identification of the sender, the identification of the certificate authority and the sender's first public key, is what is to be ensured by the digital signature. Accordingly, the first three items are to be signed utilizing known techniques as described in detail below.

Figure 2:
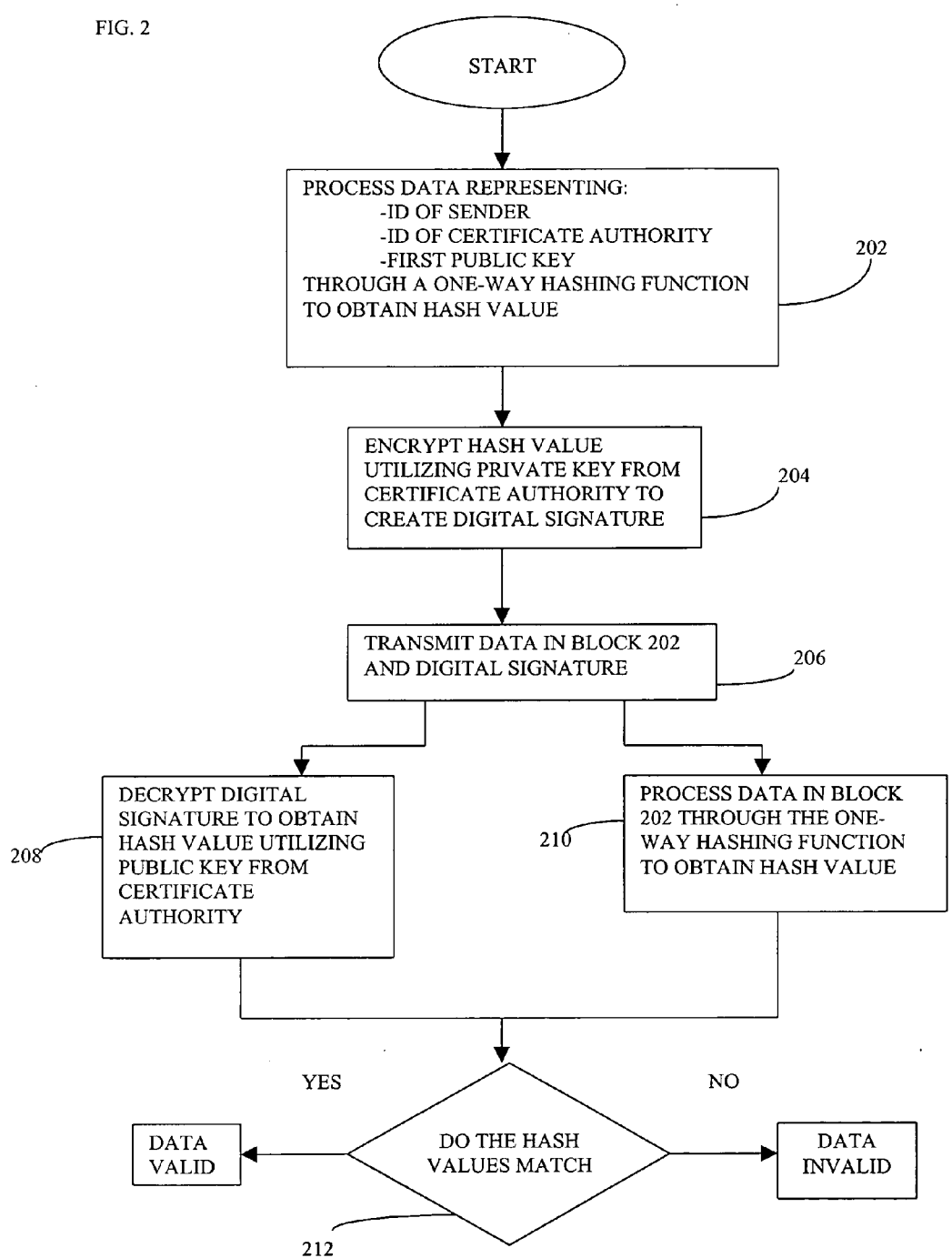
FIG. 2 is a flow chart of an exemplary method for generating a digital signature for information in a first certificate in accordance with the present invention.

Referring to FIG. 2, there is illustrated a flow chart 200 of an exemplary method for generating a digital signature for the information in the first certificate and then verifying the information utilizing the signature. The first step in the process is to process the data representing the identification of the sender, the identification of the certificate authority and the first public key utilizing a one-way hashing function which generates a fixed size output as represented at step 202 in the flow chart 200. Any type of robust hashing function may be utilized and will readily suggest themselves to those skilled in the relevant art. The fixed size hash value is then encrypted, represented at step 204 in the flow chart 200, utilizing any of the well known encryption algorithms currently available. The fixed size hash value is preferably encrypted utilizing a private key from a cryptographic key pair generated by the certificate authority. Therefore, the encrypted hash value or digital signature may only be verified utilizing the public key from the certificate authority. The public key from the certificate authority should be presumed to have been widely distributed or published and thus readily available. The digital signature along with its associated data or information is transmitted as represented at step 206 in the flow chart 200. The transmission medium utilized is assumed to be the same as that used for the transmission of the data the sender wants to send to the receiver, which in this example is a television program. Since the information or data was run through a one way hashing function to create the signature, the original cannot be obtained; accordingly, what is done to authenticate the data is to see if a decrypted hash value is the same as the computed hash value. The digital signature portion of the transmission is decrypted, represented at step 208 in the flow chart 200, utilizing the certificate authority's public key thereby creating a decrypted hash value. The data portion of the transmission is processed utilizing the same one-way hashing function as represented at step 202, in step 210, to create a fixed size hash value. The fixed size hash value output from step 210 is compared to the decrypted hash value from step 208 at step 212. If the hash values are the same, then the data transmitted is valid and if the hash values do not match, then the data is invalid. For purposes of the remaining discussion, it is to be assumed that the data comprising the first certificate is valid.

Referring back to FIG. 1, the next step in the process is the generation of a disposable cryptographic key pair as represented at step 106 in the flow chart 100. The disposable cryptographic key pair comprises a second public key and a second private key. The disposable cryptographic key pair is much shorter than the master key pair so as to reduce computer computation time. In addition, in the exemplary embodiment, the disposable cryptographic key pair may be utilized once and then discarded. Whereas typical methods for authenticating data utilize only a single cryptographic key pair, the method of the present invention utilizes multiple cryptographic key pairs.

In the next step, the sender generates and publishes a second certificate as illustrated in FIG. 1 at step 108. As opposed to the first certificate which is issued from the certificate authority, the second certificate is issued by the sender. The second certificate comprises a second identification of the sender, an identification of the signing authority, a copy of the second public key and a cryptographic check sum or digital signature. As before, this second certificate is published as widely as possible. The second identification of the sender is generally more specific than the identification of the sender in the first certificate. For example, if the identification of the sender in the first certificate is the sender's station call letters, then the second identification of the sender may be the program name to be transmitted by the sender. The identification of the signing authority is the issuer of the certificate, which in this case is the sender. The second public key is part of the disposable cryptographic key pair generated by the sender. The digital signature in this second certificate is generated by the sender. The digital signature in this second certificate is generated in the manner as described above, as well as detailed below, and is utilized to ensure the integrity of the other data in the second certificate.

Figure 3:
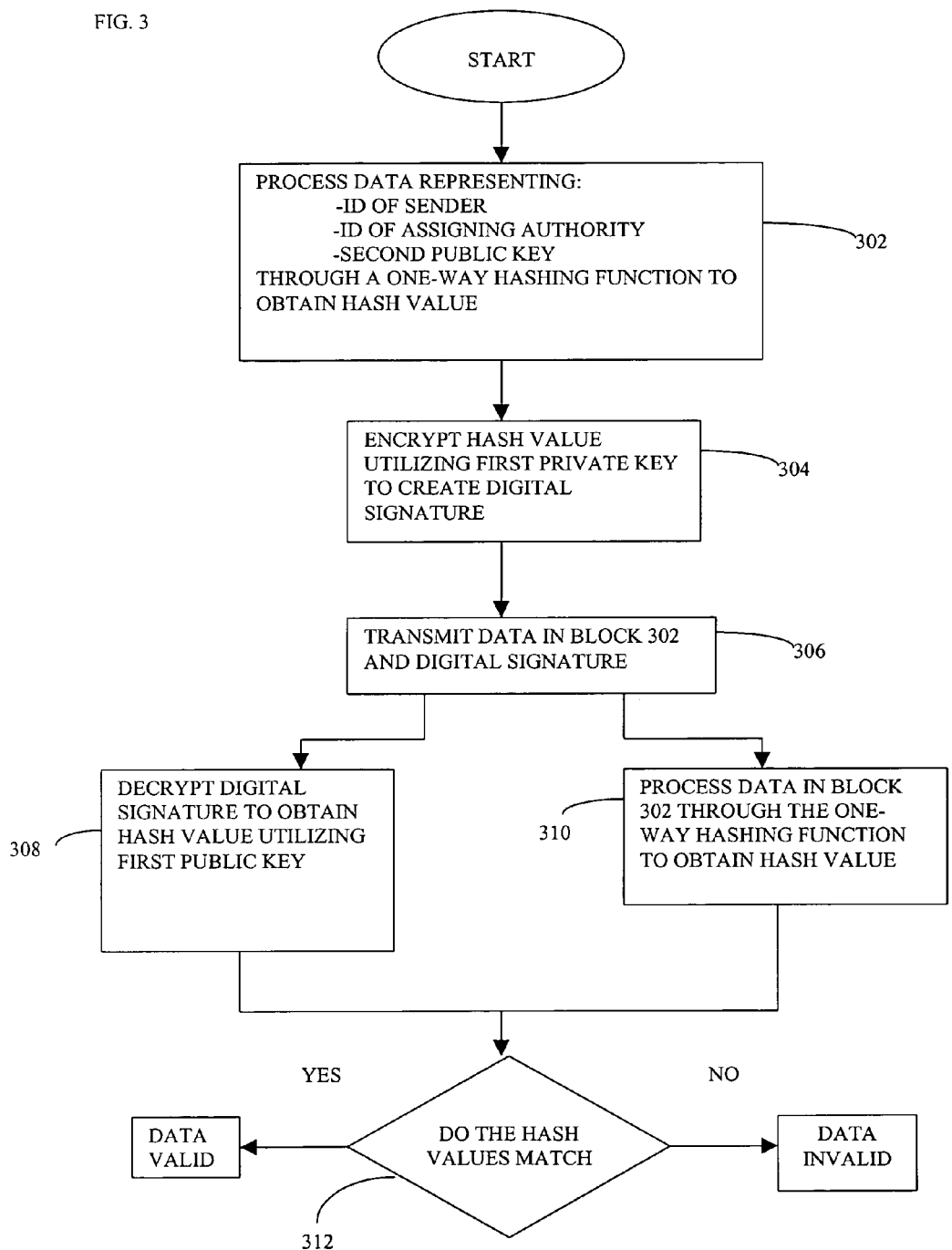
FIG. 3 is a flow chart of an exemplary method for generating a digital signature for information in a second certificate in accordance with the present invention.

Referring to FIG. 3, there is illustrated a flow chart 300 of an exemplary method for generating a digital signature for the information in the second certificate and then verifying the information utilizing the signature. The first step in the process is to process the data representing the second identification of the sender, the identification of the signing authority and the second public key utilizing a one-way hashing function which generates a fixed size output as represented at step 302. Any type of robust hashing function may be utilized and will readily suggest themselves to those skilled in the relevant art. The fixed size hash value is then encrypted, represented at step 304 in the flow chart 300, utilizing any of the well known encryption algorithms currently available. The fixed sized hash value is preferably encrypted utilizing the first private key from the master key pair. Therefore, the encrypted hash value or digital signature may only be verified utilizing the first public key from the master key pair. The first public key from the master key pair should be presumed to have been widely distributed or published and thus readily available. The digital signature along with its associated data or information is transmitted as represented at step 306 in the flow chart 300. The transmission medium utilized is assumed to be the same as that used for the transmission of the data the sender wants to send to the receiver, which in this example is a television program. The digital signature portion of the transmission is decrypted, represented at step 308 in the flow chart 300, utilizing the master cryptographic key pair's first public key thereby creating a decrypted hash value. The data portion of the transmission is processed utilizing the same one-way hashing function as represented at step 302, in step 310, to create a fixed size hash value. The fixed size hash value output from step 310 is compared to the decrypted hash value from step 308 at step 312. If the hash values are the same, then the data transmitted is valid and if the hash values do not match, then the data is invalid. For purposes of the remaining discussion, it is to be assumed that the data comprising the second certificate is valid.

Since it is assumed that the data or information comprising the first and second certificates is authentic, the receiver has a reliable copy of the first public key of the master cryptographic key pair and the second public key of the disposable cryptographic key pair. Accordingly, the sender may now transmit the data comprising the information to be shared with the receiver, which in this example is a television program.

As stated above, any type of transmission medium may by utilized. However, the data to be transmitted is preferably packetized. With the data packetized, each packet may be individually authenticated. For the transmission of data, each packet of data is signed in the same manner as above and the encryption is done with the second private key of the disposable cryptographic key pair. A detailed decryption of the signing of the data packets is given subsequently, however, it is important to note that the second private key is utilized because it is purposefully short and therefore requires less computational time. In addition, for the very same reason, a weaker hashing function is utilized at this juncture.

Referring back to FIG. 1, the next step in the method is to authenticate the data received as illustrated at step 110 in the flow chart 100. Each packet of data is protected by an encrypted hash or digital signature. Unlike above, and for efficiency sake, a full certificate is not replicated in each data packet, rather just the data comprising each data packet and the digital signature.

Figure 4:
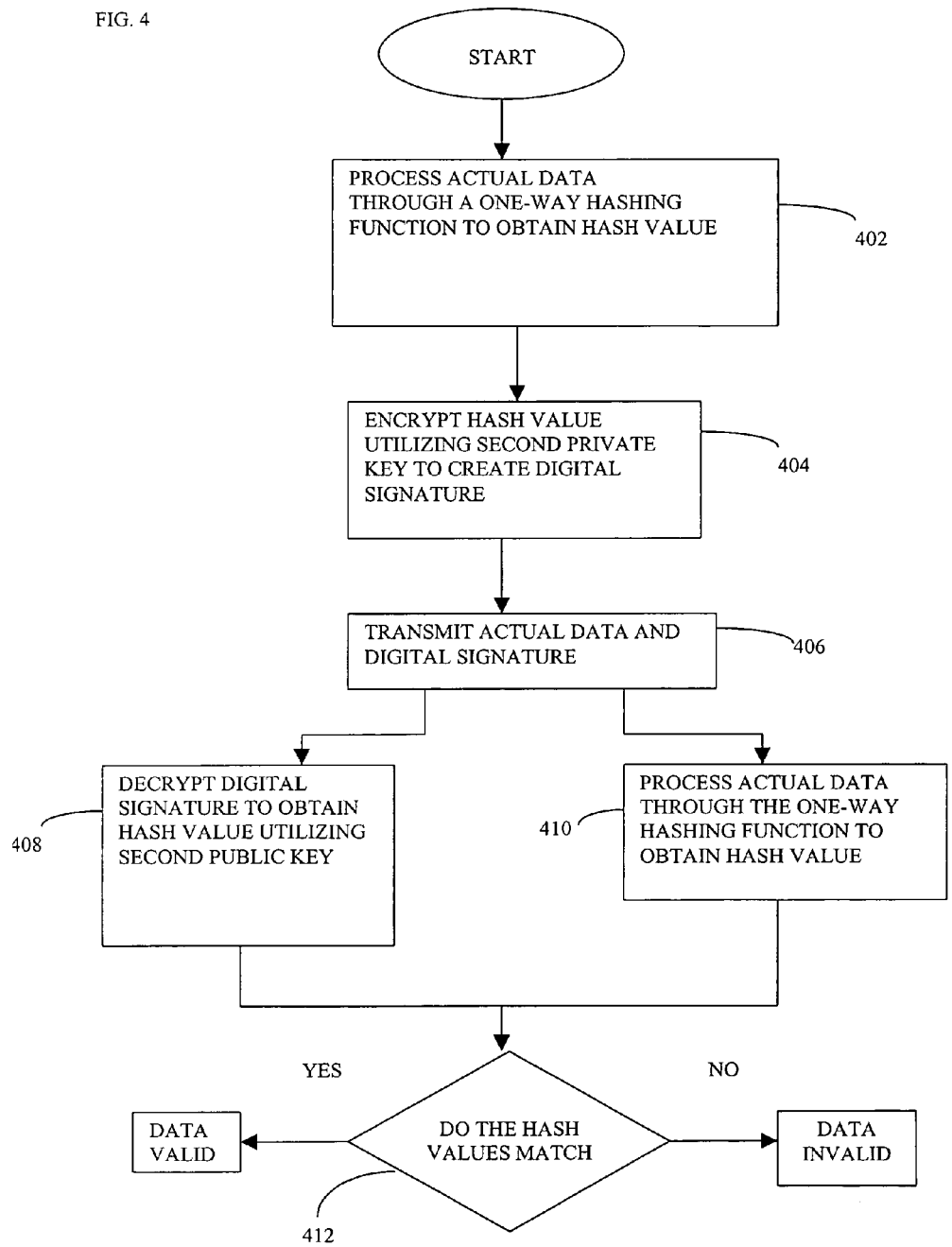
FIG. 4 is a flow chart of an exemplary method for generating a digital signature for the data to be transmitted in accordance with the present invention.

Referring to FIG. 4, there is illustrated a flow chart 400 of an exemplary method for generating a digital signature for the data to be transmitted and then verifying the data utilizing the digital signature. The first step in the process is to process the data in the data packet utilizing a one-way hashing function which generates a fixed size output as represented by step 402 in the flow chart 400. This hashing function may be much simpler than the previously described hashing functions because the information required to verify the actual data was transmitted in the first and second certificates which utilized robust hashing functions. Accordingly, a weak hashing function would reduce computational time by decreasing the number of repetitions in the hashing algorithm. The fixed size hash value is then encrypted, represented by step 404 in the flow chart 400, utilizing any of the well known encryption algorithms. The fixed size hash value is preferably encrypted utilizing the second private key from the disposable cryptographic key pair.

Once again, computational time is saved by utilizing the disposable cryptographic key pair which is intentionally made shorter than the master cryptographic key pair. The digital signature along with the packet of data is transmitted as represented by step 406 in the flow chart 400. The digital signature portion is decrypted, represented by step 408 in the flow chart 400, utilizing the second public key of the disposable cryptographic key pair which was transmitted previously with the second certificate thereby creating a decrypted hash value. The data portion is processed utilizing the same one-way hashing function as represented at step 402, in step 410, to create a fixed size hash value. The fixed size hash value output from step 410 is compared to the decrypted hash value from step 408 at step 412. If the hash values are the same, then the data is authentic. If the hash values are not the same, then the data in not authentic.

It is important to note that according to the present invention, it is the hash value that is encrypted and not the data itself. Accordingly, the data is not concealed or corrupted in any way. Even if a receiver were not able to authenticate the data, the receiver would still be able to view and utilize the data if he/she so desires. Essentially, as each unit of signed data is received, the receiver strips off the digital signature for authentication and utilizes the data. The data may be read or otherwise utilized even without knowledge of the keys transmitted with the certificates, but only a recipient having the proper second public key can verify that the digital signature does in fact belong to the sender. Basically, all that is needed to utilize the data is to know the length of the digital signature so that the data portion can be stripped out. If the receiver is unable to authenticate the data, it is preferable that there be some indication that the data may not be reliable.

In accordance with the exemplary embodiment, the sender periodically retransmits the second certificate comprising the second public key. This is done because the receiver may have tuned into the transmission prior to receiving the second certificate and have no way of decrypting the digital signature. The periodic retransmission is interlaced with the signed data and preferably does not interfere with the transmission. In addition, for longer transmissions, it may be preferable to change the disposable cryptographic key pair as suggested above. Since it is a much smaller key pair for speed, it may be more easily broken. Accordingly, for long transmissions where hackers may be able to have time to work, the sender may periodically change the disposable cryptographic key pair.

Figure 5:
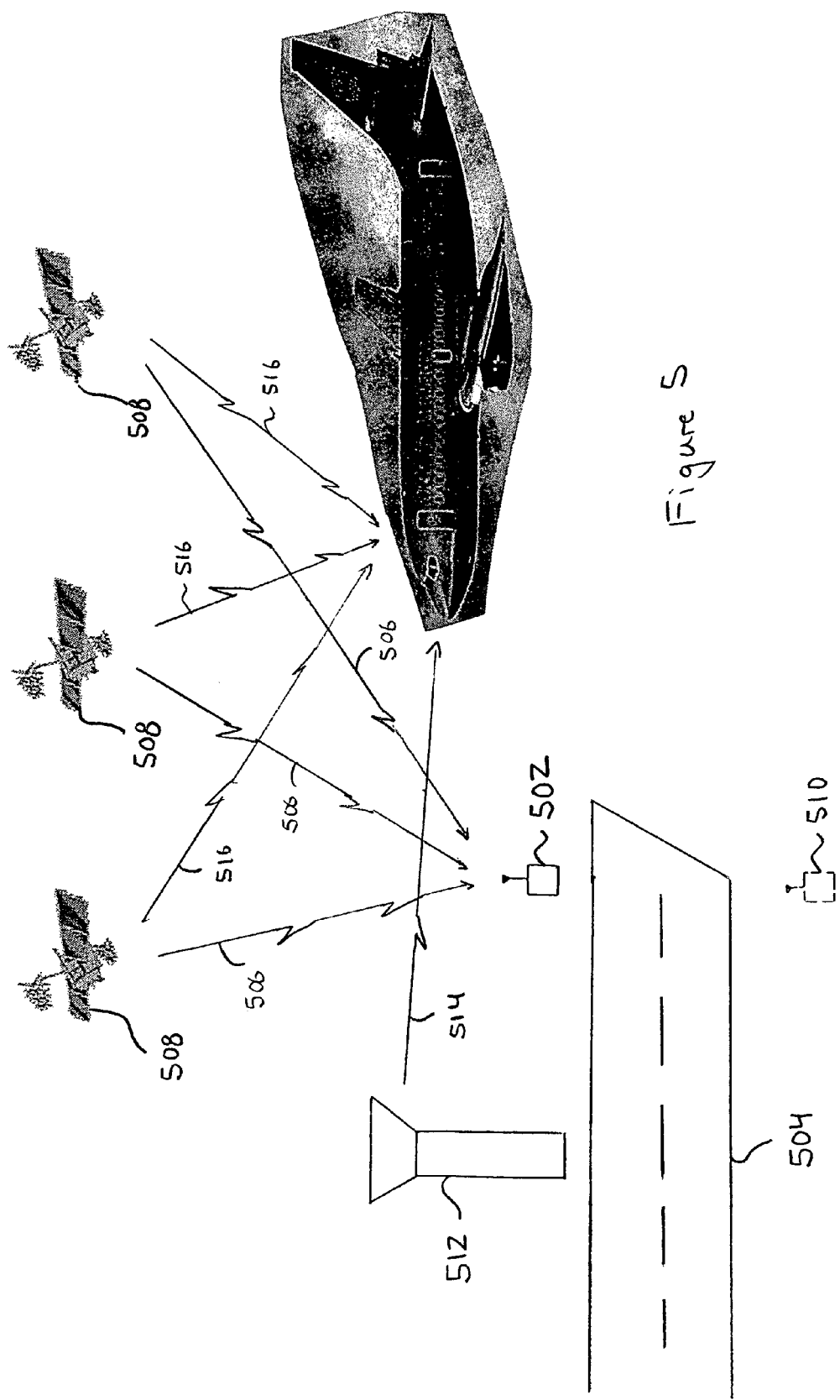
FIG. 5 is a diagrammatic representation of an airport GPS system.

Although the exemplary embodiment described above relates to the broadcast of audio and visual data for television, there are a multiplicity of users for real time authentication. FIG. 5 illustrates an exemplary embodiment of the present invention used to authenticate data from a version of a Global Positioning Satellite (GPS) system.

Before discussing the GPS system in connection with the present invention, what follows is a brief discussion of the background and function of the GPS system (GPS) in general. GPS is a constellation of artificial satellites and Earth-based stations developed and implemented by the US military. The system serves as an electronic navigation reference for land vehicles, marine vessels and aircraft, both military and civilian. The system uses well-known principles of radio ranging and triangulation, and in operation, each satellite in the system transmits a sequence of data that when properly received and interpreted, allows anyone using the system to pin-point their location and better determine the proper heading that will lead to their intended destination. In other words, the satellites serve as reference points that provide the user with an instant reading of longitude, latitude, altitude, and distance, from any point relative to any other satellite. GPS receivers can compute speed and direction based on the difference between successive position measurements.

Included in the data transmitted by each satellite is its own identification, its position, its local time, and a first and second pseudo random noise code. The first and second pseudo random noise codes are presented in digital form and both are relatively long in length. The first code is known as a course acquisition code and is generally made available to all civilian user of the system under the GPS-Standard Positioning Service. The GPS-Standard Positioning Service is accurate anywhere from approximately five meters to approximately one hundred meters. The second code is known as a precision code and is usually encrypted for use only by the military under what is sometimes referred to as the Precise Positioning Service. The second code is encrypted to prevent use of the Precise Positioning Service by unintended or hostile forces. Use of the first code in combination with the second code, the military version, permits the GPS system to be accurate to within a matter of centimeters. In addition, the US military can purposely degrade the accuracy of the course acquisition code to further prevent use of the GPS system by unintended or hostile forces. The pseudo random noise codes are generated and transmitted both by the satellite and by the user's receiver. A comparison is made between the codes received from the satellite and the codes generated by the receiver in order to calculate a shift error or displacement. The shift error or displacement represents the precise range or distance of the receiver from the satellite. The receiver uses a process of triangulation with other satellites to determine the range from any other point.

For land vehicles, marine vessels and aircraft provided with the GPS system, the system is an extremely useful aid to navigation during periods of low or no visibility and at night. As shown in FIG. 5, a commercial or private aircraft 500 equipped with the GPS system is attempting to land with the aid of a version of GPS known as Differential-GPS (D-GPS). D-GPS is more accurate than the civilian GPS-Standard Positioning Service system discussed above, and is intended to provide highly accurate GPS data in and around a fixed installation like airports. In operation at an airport, a D-GPS receiver 502 is positioned at a known location near a runway 504. The receiver 502 calculates its position based on signals 506 received from GPS satellites 508. The position of the receiver 502 is somewhat inaccurate as discussed above with respect to the GPS-Standard Positioning Service. Thus, the runway receiver 502 is lead to calculate a position indicated as 510, instead of the true location shown for D-GPS receiver 502. Accordingly, the control tower 512 compares the calculated position 510 with the actual known position of the D-GPS receiver 502, and determines how much of a correction is necessary to bring the two positions into alignment. The aircraft 500 will also miscalculate its position by the same amount as the D-GPS receiver 502. The control tower 512 broadcasts correction data 514 in the form of a digital data stream to the aircraft 500, and to all other aircraft in the area. The aircraft 500 computes its position by means of the received GPS signals 516, then adjusts its computation using the correction factor. The corrected position is accurate enough to allow the aircraft 500 to land on the runway 504 properly even under conditions of low or zero visibility and at night.

In this case, the present invention provides a method to authenticate the correction data sent by the control tower

512, by applying a digital signature to the data that can be identified by the aircraft 500 as only belonging to the control tower 512. This allows the aircraft 500 to know that the correction data it receives came from the control tower 512, rather than from an unintended or hostile source.

Although not shown, another conceivable use of the present invention involves the field of telemedicine, wherein medical data, a CAT scan image for example, is transmitted and received in electronic form. In such case, it would be desirable for the receiver of the medical data, in this example the CAT scan image, to be assured that the data did in fact originate from the indicated sender. Hence, the sender would apply a digital signature and the receiver would authentic that digital signature according to the present invention, thereby certifying that the medical data received is originated form the indicated sender.

Another conceivable use of the present invention, also not shown, involves the field of audio and video surveillance. It is well known that many homeowners and businesses protect their premises with video cameras and audio sensing devices. The signal from these cameras and audio devices runs through standard wiring, which usually not armored or protected from tampering. It is conceivable that an intruder might cut the wiring, and then inject a false video or audio signal, thereby causing an innocent scene to be displayed or received by security personnel. Thus, while the security personnel unknowingly monitor the false signal instead of the true video or audio signal, an intruder would be free to conduct unauthorized activity on the premises without detection.

In order to prevent this false signal from deceiving the security personnel, the true signal from the security camera or audio device would include a digital signature generated according to the present invention. Therefore, if the signals received from the camera or audio device are not authenticated by the digital signature, an automatic alarm system would immediately notify the security personnel.

Other conceivable uses of the present invention, also not shown, involve any digital network that relies on transmitting over the network control messages mixed with data, such as occurs with air traffic control systems, electrical power generation systems, SCADA (Supervisory Control And Data Acquisition) systems, oil and gas pipelines arrangements, and railroad traffic management. In most networks today, the control messages are not authenticated, or use only a password transmitted in the clear, which makes the network vulnerable to disruption by anyone who can observe either the data or the control messages. Disruption of the control messages could cause the underlying infrastructure to behave inconsistently, whereby messages or physical items may be misdirected or simply lost. In the case of the electric power generation systems, SCADA systems, railroad traffic management, and air traffic control system, false messages could cause loss of life. The present invention would prevent such disruption by providing a digital signature that only upon authentication would indicate to the receiver that the data or message did in fact originate from the intended and authorized sender.

Although shown and described is what are believed to be the most practical and preferred embodiments, it is apparent that departures from specific methods and designs described and shown will suggest themselves to those skilled in the art and may be used without departing from the spirit and scope of the invention. The present invention is not restricted to the particular constructions described and illustrated, but should be construed to cohere with all modification that may fall within the scope of the appended claims.

What is claimed is:

1. A method for authenticating transmitted data in real time, said data transmitted as a stream of packets over a publicly available medium, the method comprising:
   generating a master cryptographic key pair, including a long first public key and a long first private key;
   publishing a first certificate issued by a certificate authority, the first certificate including the first public key and a first digital signature of the first public key based on a private key from the certificate authority;
   generating a disposable cryptographic key pair, including a second public key and second private key;
   generating a second certificate, the second certificate including the second public key and a second digital signature of the second public key based on the first private key;
   publishing the second certificate;
   signing the packets of data to be transmitted with a third digital signature by processing the data to be transmitted through a first one way hashing function to generate a first hash value and encrypting the first hash value utilizing the second private key;
   processing received data through the first one way hashing function to create a second hash value;
   decrypting the received third digital signature utilizing the second public key to obtain a third hash value; and
   verifying authenticity of the received data by comparing the second hash value to the third hash value,
   wherein the first private key, the second private key, and the private key from the certificate authority have different values.

2. The method for authenticating transmitted data in real time according to claim 1, wherein the first certificate further includes an identification of a sender and an identification of a certificate authority issuing the first certificate.

3. The method for authenticating transmitted data in real time according to claim 2, wherein the first digital signature is produced by:
   processing information representing the identification of the sender, the identification of the certificate authority issuing the first certificate and the first public key through a second one way hashing function to create a fourth hash value; and
   encrypting the fourth hash value utilizing the private key from the certificate authority issuing the first certificate to create the first digital signature.

4. The method for authenticating transmitted data in real time according to claim 3, further comprising the step of verifying authenticity of data comprising the first certificate.

5. The method for authenticating transmitted data in real time according to claim 4, wherein the step of verifying the authenticity of the data comprising the first certificate comprises:
   decrypting the first digital signature to obtain a fifth hash value utilizing a public key issued by the certificate authority issuing the first certificate;
   processing the received information representing the identification of the sender, the identification of the certificate authority issuing the first certificate and the first public key through the second one way hashing function to create a sixth hash value; and
   comparing the fifth and sixth hash values.

6. A method for authenticating transmitted data in real time, said data transmitted as a stream of packets over a publicly available medium, the method comprising:
   generating a master cryptographic key pair, including a first public key and a first private key;

publishing a first certificate issued by a certificate authority, the first certificate including the first public key and a first digital signature of the first public key based on a private key from the certificate authority;

generating a disposable cryptographic key pair, including a second public short key and second short private key;

generating a second certificate, the second certificate including the second public key and a second digital signature of the second public key based on the first private key;

publishing the second certificate;

signing the packets of data to be transmitted with a third digital signature by processing the data to be transmitted through a first one way hashing function to generate a first hash value and encrypting the first hash value utilizing the second private key;

processing received data through the first one way hashing function to create a second hash value;

decrypting the received third digital signature utilizing the second public key to obtain a third hash value; and verifying authenticity of the received data by comparing the second hash value to the third hash value, wherein the first private key, the second private key, and the private key from the certificate authority have different values.

7. The method for authenticating transmitted data in real time according to claim 1, wherein the second certificate further includes the identification of the sender and an identification of a signing authority issuing the second certificate.

8. The method for authenticating transmitted data in real time according to claim 7, wherein the second digital signature is produced by:

processing the data representing the identification of the sender, the identification of the signing authority issuing the second certificate and the second public key through a third one way hashing function to create a seventh hash value; and encrypting the seventh hash value utilizing the first private key to create the second digital signature.

9. The method for authenticating transmitted data in real time according to claim 8, further comprising the step of verifying the authenticity of the data comprising the second certificate.

10. The method for authenticating transmitted data in real time according to claim 9, wherein the step of verifying the authenticity of the data comprising the second certificate comprises:

decrypting the second digital signature to obtain an eighth hash value utilizing the first public key;

processing the received data representing the identification of the sender, the identification of the signing authority issuing the second certificate and the second public key through the third one way hashing function to create a ninth hash value; and comparing the eighth and ninth hash values.

11. A method for authenticating transmitted data in real time, said data transmitted as a stream of packets over a publicly available medium, the method comprising:

(a) generating a master cryptographic key pair, including a first public key and a first private key;

(b) publishing a first certificate issued by a certificate authority, the first certificate including the first public key and a first digital signature of the first public key based on a private key from the certificate authority;

(c) generating a disposable cryptographic key pair, including a second public key and second private key;

(d) generating a second certificate, the second certificate including the second public key and a second digital signature of the second public key based on the first private key;

(e) publishing the second certificate;

(f) signing the packets of data to be transmitted with a third digital signature by processing the data to be transmitted through a first one way hashing function to generate a first hash value and encrypting the first hash value utilizing the second private key;

(g) processing received data through the first one way hashing function to create a second hash value;

(h) decrypting the received third digital signature utilizing the second public key to obtain a third hash value; and (i) verifying authenticity of the received data by comparing the second hash value to the third hash value, wherein the first private key, the second private key, and the private key from the certificate authority have different values; and dividing the data into packets and signing and authenticating each packet of data in accordance with steps (f) through (i).

12. A method for digitally signing data in real time, said data to be transmitted as a stream of packets over a publicly available medium, the method comprising:

generating a master key pair including a long first public key and a long first private key;

publishing a first certificate, the first certificate including the first public key and a first digital signature based on a key pair of a certificate authority;

generating a disposable key pair, the disposable key pair including a second public key and a second private key, and wherein the disposable key pair is shorter than the master key pair;

generating a second certificate, the second certificate including the second public key and a second digital signature based on the master key pair;

dividing the data to be signed into the packets;

for each packet of data, computing a hash value based on the data in the packet utilizing a one way hashing function;

encrypting the hash value utilizing the second private key as the encryption key; and coupling each encrypted hash value with its corresponding data packet.

13. A method for verifying digitally signed data in real time, said data transmitted as a stream of packets over a publicly available medium, the method comprising:

processing a data portion of the digitally signed data through a one way hashing function to obtain a first hash value for each of the packets of digitally signed data;

verifying contents of a first certificate issued by a certificate authority utilizing a public key issued by the certificate authority, the first certificate including a long first public key of a long master key pair, the master key pair including a long private key;

verifying contents of a second certificate issued by a sender of the data utilizing the first public key from the first certificate, the second certificate including a second public key of a short disposable key pair that is shorter than the long master key pair;

decrypting a digital signature portion of the digitally signed data utilizing the second public key to obtain a second hash value; and comparing the first and second hash values.

* * * * *